No. 808,870. PATENTED JAN. 2, 1906.
H. F. PURDUM.
SELF LOADING SCRAPER.
APPLICATION FILED MAY 6, 1905.
2 SHEETS—SHEET 1.
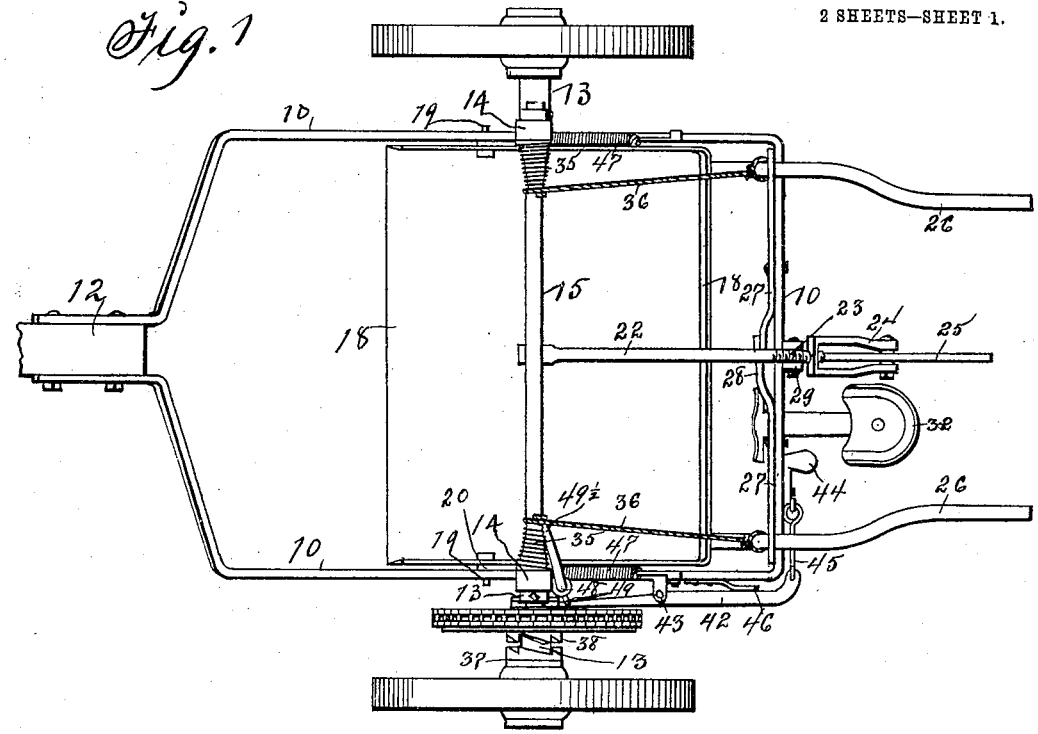
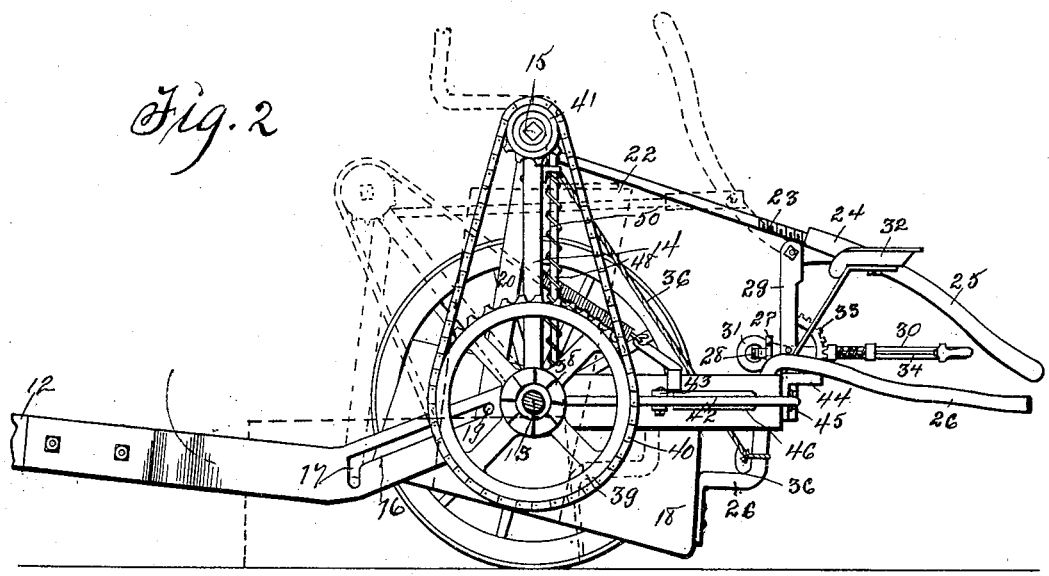

No. 808,870. PATENTED JAN. 2, 1906.
H. F. PURDUM.
SELF LOADING SCRAPER.
APPLICATION FILED MAY 6, 1905.
2 SHEETS—SHEET 2.
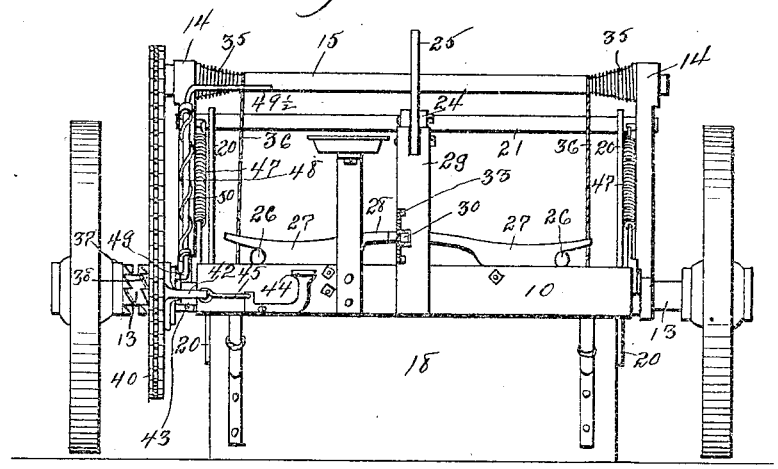
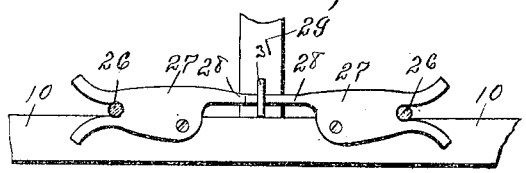
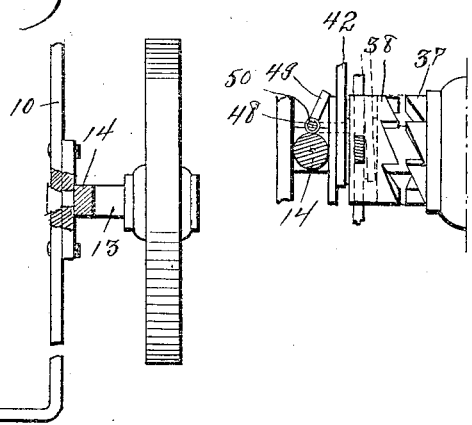
Witnesses: Inventor: Herschel F. Purdum,
By Thomas G. Orwig, Attorney.

UNITED STATES PATENT OFFICE.

HERSCHEL F. PURDUM, OF SAC CITY, IOWA.

SELF-LOADING SCRAPER.

No. 808,870.    Specification of Letters Patent.    Patented Jan. 2, 1906

Application filed May 6, 1905. Serial No. 259,648.

*To all whom it may concern:*

Be it known that I, HERSCHEL F. PURDUM, a citizen of the United States, residing at Sac City, in the county of Sac and State of Iowa, have invented a new and useful Self-Loading Scraper, of which the following is a specification.

My object is, first, to provide a wheel-scraper upon which the operator can ride; second, to provide means by which the operator on the seat can place the machine in and out of gear; third, to provide means by which the operator can adjust the scraper as required for taking up ground as it is advanced; fourth, to provide means for adjusting the scraper when loaded for carrying ground from one place to another; fifth, to automatically lift the loaded scraper into position as required to dump its contents while the horses hitched thereto are in motion.

My invention consists in the construction, arrangement, and combination of elements and subcombinations, as hereinafter set forth, pointed out in my claims, and illustrated in the accompanying drawings, in which—

Figure 1 is a top view of the machine and shows the positions of all the operative parts relative to each other and the carriage that carries the adjustable scraper. Fig. 2 is a side elevation that shows one of the traction-wheels removed. Dotted lines indicate the position of the main parts of the structure when it is to take up loose ground and also its position when it has dumped a load. Fig. 3 is a rear end view of the machine and shows the scraper flat on the ground and the traction-wheels supported thereby in an operative position as required to utilize the weight of the machine and the driver thereon for pressing the scraper down while it is taking on a load of ground as the machine is advanced by horses hitched thereto. Fig. 4 is an enlarged view of the inside of the rear end of the carriage-frame and means attached for locking handles fixed to the rear end of the scraper. Fig. 5 shows the manner of connecting the stub carriage-axles with the carriage-frame by means of journals on the inner ends of axles. Fig. 6 shows the clutch mechanism for placing the machine in and out of gear by means of the treadle shown in Fig. 1.

The numeral 10 designates an oblong carriage-frame, to which a pole 12 is fixed at the center of its front end. Stub-axles 13 are fixed to the parallel sides of the frame at their central portion, and uprights 14 are pivotally connected with the axles, as shown in Fig. 5, or in any suitable way to support a rotatable shaft 15, mounted thereon, as shown in Figs. 1 and 3, for coiling ropes thereon as required to lift and dump the scraper when it is loaded. The parallel sides of the frame 10 have double bends at their central portions and slots or bridles 16 in the downwardly-inclined portions and vertical downward extensions 17 at the lower ends of the bridles to be traversed by trunnions that extend from the sides of the scraper.

A scraper 18 is pivotally connected with the sides of the frame 10 by means of trunnions 19, fixed to bars 20, that are fixed to the sides of the scrapers. The trunnions extend through the bridles 16 as required to adjustably support and carry the scraper. The bars 20 are pivotally connected at their top ends with a cross-bar 21, that is fixed to the uprights 14, as shown in Fig. 3, or in any suitable way, in such a manner that it will vibrate with the upright 14 as required to place the scraper on the ground, as indicated by dotted lines in Fig. 2. A bar 22 is fixed to the center of the cross-bar and extended rearward and terminates in a screw 23. A lever-bearer 24 is adjustably connected with the screw and a lever 25 fulcrumed in the bearer, as shown in Fig. 1, for the purpose of moving the shaft 15, the uprights 14, and the cross-bar 21 forward, as indicated by dotted lines in Fig. 2 and as required for placing the scraper into position for taking up loose ground. In the normal condition the lever is in an eccentric position and retains the bar 22 and the scraper in stationary position, as shown in Fig. 1.

Double elbow-shaped handles 26 are fixed to the rear end of the scraper 18, as shown in Figs. 1 and 2, to project upward and rearward. Detents 27 are pivoted to the rear cross-piece of the frame 10. They are forked at their outer ends and terminate in inwardly-inclined extensions 28. The detents 27 are in front of the rear cross-piece of the carriage-frame 10 and partially hidden by said cross-piece in Fig. 3; but Fig. 4 is a front view of the same cross-piece and shows the detents 27 in full.

An upright 29 is fixed to the rear and center of the frame 10, and a lever 30 is pivoted in a slot in said upright and provided with a ring 31 at the end of its short arm, into which ring the extensions 28 are projected in such a manner that when the lever is elevated by the operator on the seat 32 the detents 27 will push the handles 26 upward to change the position of the scraper 18 as required to place it into an operative position on the ground. A segmental rack 33 is fixed to the upright 29 to be engaged by a spring-actuated pawl 34, as shown in Fig. 2.

To rotate the shaft 15, it is provided with tapering and spirally-grooved enlargements 35 at its ends, and ropes 36 are fixed to the small end of the enlargements 35 and to the handles 26 of the scraper 18 in such a manner that when the machine is in motion and the clutch members 37 and 38 on one of the stub-axles 13 are united a sprocket-wheel 39 on one of the clutch members will, by means of a chain 40 and a sprocket-wheel 41 on the end of the shaft 15, rotate the shaft and wind the ropes 36 on the enlargements 35, and as the ropes are wound thereon the handles 26 of the scraper 18 will be raised as required to lift and dump the loaded scraper. The starting to left will be slow and increased in speed as the ropes are coiled on the tapering enlargement 35.

To adjust the clutch member 38 on the stub-axle as required to engage the mating member 37 on the hub of the traction-wheel, a lever 42 is pivotally connected with the side of the frame 10 by means of a fixed bearer 43, as shown in Fig. 1, and connected at its rear end with a treadle 44, pivoted to the rear end of the frame by means of a link 45 and connected with the clutch 38 at its front end in such a manner that a leaf-spring 46, fixed to the side of the frame 10, will normally retain the two clutches separated and in inoperative position. To make them operative, the operator on the seat can readily do so whenever required by pressing his foot on the treadle.

Springs 47 are fixed to the sides of the frame 10 and to the cross-bar 21, as shown in Fig. 3 or in any suitable way, to normally retain the cross-bar in alinement with the shaft 15 as required when the scraper 18 is flat on the ground to take up loose ground.

A device for automatically locking and unlocking the clutch members 37 and 38 consists in a spring-actuated rock-shaft 48 in bearings fixed to one of the uprights 14, as shown in Figs. 2 and 3. It has an arm 49 at its lower end, as shown in Figs. 3 and 6, that engages the clutch 38, as indicated by dotted lines in Fig. 6 and as required to lock the clutches together, and an arm 49½ at its top end, that is engaged by the upright 14 and the enlargement 35 on the end of the shaft 15, as shown in Figs. 1 and 3, and when the uprights 14 and the shaft 15 are thrown forward by means of the lever 25 and the bar 22 the spring 50 on the rock-shaft 48 (shown in Figs. 2 and 3) will free that shaft and allow it to be actuated by the treadle 44 and lever 42 as required to thereby separate the clutch members and make them inoperative whenever required in adjusting and dumping the scraper 18. The spring 50 normally retains the rock-shaft 48 stationary and the clutches locked.

Having thus set forth the purpose of my invention and described the construction and function of each element and subcombination, the practical operation and utility of the machine will be obvious to persons familiar with the art to which it pertains.

What I claim as new, and desire to secure by Letters Patent, is—

1. In a wheel-scraper, a carriage-frame having bridles in its parallel sides and a scraper having trunnions extended through said bridles to traverse them and means to adjust the scraper relative to the carriage-frame, for the purposes stated.

2. In a wheel-scraper, an oblong carriage-frame, stub-axles fixed to the parallel sides of the frame, a scraper adjustably connected with the sides of the frame, uprights pivotally connected with the stub-axles and a rotatable shaft mounted in the top portions of the uprights and means to move the uprights and rotatable shaft forward to elevate and dump the scraper.

3. In a wheel-scraper, an oblong carriage-frame, stub-axles connected to the parallel sides of the frame, uprights pivotally connected with the stub-axles and a rotatable shaft mounted in the top portions of the uprights, tapering enlargements on the end of the shaft, a scraper having handles fixed to its rear end, ropes fixed to the handles and to the enlargements on the end of the shaft.

4. In a wheel-scraper, an oblong carriage-frame, stub-axles connected to the parallel sides of the frame, uprights pivotally connected with the stub-axles and a rotatable shaft mounted in the top portions of the uprights, tapering enlargements spirally grooved, ropes fixed to the small end of the grooved enlargements and to the double elbow-shaped handles fixed to the rear of the scraper.

5. In a wheel-scraper, an oblong carriage-frame, stub-axles connected to the parallel sides of the frame, uprights pivotally connected with the stub-axles and a rotatable shaft mounted in the top portions of the uprights, traction-wheels on the stub-axles, a clutch member on the end of one of the hubs a mating movable clutch member on the same axle and means to operate the movable clutch member.

6. In a wheel-scraper, an oblong carriage-frame, stub-axles connected to the parallel sides of the frame, uprights pivotally connected with the stub-axles and a rotatable shaft mounted in the top portions of the uprights, traction-wheels on the stub-axles, a clutch member on the end of one of the hubs, a mating movable clutch member on the same axle, a lever fulcrumed to the carriage-frame to engage the movable clutch, a leaf-spring fixed to the side of the carriage-frame to normally retain the clutches in engagement and a treadle fixed to the rear end of the frame and connected with the lever for separating the clutch members to operate the movable clutch member.

7. In a wheel-scraper, an oblong carriage-frame, stub-axles connected to the parallel sides of the frame, uprights pivotally connected with the stub-axles and a rotatable shaft mounted in the top portions of the uprights, traction-wheels on the stub-axles, a clutch member on the end of one of the hubs a mating movable clutch member on the same axle, a lever fulcrumed to the carriage-frame to engage the movable clutch, a leaf-spring fixed to the side of the carriage-frame to normally retain the clutches in engagement and a treadle fixed to the rear end of the frame and connected with the lever for separating the clutch members to operate the movable clutch member, a spring-actuated rock-shaft in bearings fixed to one of the uprights, an arm at its lower end to lock the movable clutch and an arm at its upper end to contact with the rotatable shaft in the top of the uprights to retain the rock-shaft stationary and the spring on the shaft inoperative.

8. In a wheel-scraper, an oblong carriage-frame, stub-axles connected to the parallel sides of the frame, uprights pivotally connected with the stub-axles and a rotatable shaft mounted in the top portions of the uprights, traction-wheels on the stub-axles, a clutch member on the end of one of the hubs, a mating movable clutch member on the same axle and means to operate the movable clutch member, a cross-bar fixed to uprights pivoted to the stub-axles, a bar fixed to the center of the cross-bar and a lever-bearer connected with the end of it, a lever pivoted to the lever-bearer and fulcrumed to the top of the upright at the rear and center of the carriage-frame and a scraper adjustably connected with the parallel sides of the carriage-frame.

9. In a wheel-scraper, an oblong carriage-frame, stub-axles connected to the parallel sides of the frame, uprights pivotally connected with the stub-axles and a rotatable shaft mounted in the top portions of the uprights, traction-wheels on the stub-axles, a clutch member on the end of one of the hubs a mating movable clutch member on the same axle and means to operate the movable clutch member, a cross-bar fixed to uprights pivoted to the stub-axles, a bar fixed to the center of the cross-bar and a lever-bearer connected with the end of it, a lever pivoted to the lever-bearer and fulcrumed to the top of the upright at the rear and center of the carriage-frame a scraper adjustably connected with the sides of the carriage-frame and a seat for an operator at the side of said lever at the rear end of the frame.

10. In a wheel-scraper, an oblong carriage-frame, a scraper adjustably connected with the sides of the frame stub-axles connected to the parallel sides of the frame, uprights pivotally connected with the stub-axles and a rotatable shaft mounted in the top portions of the uprights, traction-wheels on the stub-axles, a clutch member on the same axle and means to operate the movable clutch member on the same axle, a cross-bar fixed to uprights pivoted to the stub-axles, a bar fixed to the center of the cross-bar and a lever-bearer connected with the end of it, a lever pivoted to the lever-bearer and fulcrumed to the top of the upright at the rear and center of the carriage-frame and a seat for an operator at the side of said lever and means for holding and lifting the double elbowed handles and scraper.

11. In a wheel-scraper, an oblong carriage-frame, a scraper adjustably connected with the carriage-frame, handles fixed to the rear end of the scraper stub-axles connected to the parallel sides of the frame, uprights pivotally connected with the stub-axles and a rotatable shaft mounted in the top portions of the uprights, traction-wheels on the stub-axles, a clutch member on the same axle and means to operate the movable clutch member, a cross-bar fixed to uprights pivoted to the stub-axles, a bar fixed to the center of the cross-bar and a lever-bearer connected with the end of it, a lever pivoted to the lever-bearer and fulcrumed to the top of the upright at the rear and center of the carriage-frame, a seat for an operator at the side of said lever and detents pivoted to the rear end of carriage-frame for holding and lifting the double elbowed handles and scraper.

12. In a wheel-scraper, an oblong carriage-frame, a scraper adjustably connected with the carriage-frame stub-axles fixed to the parallel sides of the frame, uprights pivotally connected with the stub-axles and a rotatable shaft mounted in the top portions of the uprights, traction-wheels on the stub-axles, a clutch member on the same axle and means to operate the movable clutch member, a cross-bar fixed to uprights pivoted to the stub-axles, a bar fixed to the center of the cross-bar and a lever-bearer and connected with the end of it, a lever pivoted to the lever-bearer and fulcrumed to the top of the upright at the rear and center of the carriage-frame and a seat for an operator at the side of said lever, detents forked at their outer ends and terminating with inclined extensions at their inner ends and means to lock the detents pivoted to the rear end of carriage-frame for holding and lifting the handles fixed to the scraper.

13. In a wheel-scraper, an oblong carriage-frame having bridles in its parallel sides, a scraper having fixed trunnions in said bridles stub-axles fixed to the parallel sides of the frame, uprights pivotally connected with the stub-axles and a rotatable shaft mounted in the top portions of the uprights, traction-wheels on the stub-axles, a clutch member on the same axle and means to operate the movable clutch member, a cross-bar fixed to uprights pivoted to the stub-axles, a bar fixed to the center of the cross-bar and a lever-bearer and connected with the end of it, a lever pivoted to the lever-bearer and fulcrumed to the top of the upright at the rear and center of the carriage-frame, a seat for an operator at the side of said lever, detents forked at their outer ends and terminating with inclined extensions at their inner ends, a lever pivoted to the upright at the rear of the carriage-frame and provided with a ring at the end of its short arm to admit the extensions of the detents and means to lock the detents pivoted to the rear end of carriage-frame for holding and lifting the double elbowed handles and scraper.

14. In a wheel-scraper, an oblong carriage-frame having bridles in its parallel sides to admit trunnions, a scraper having fixed trunnions in said bridles stub-axles fixed to the parallel sides of the frame, uprights pivotally connected with the stub-axles and a rotatable shaft mounted in the top portions of the uprights, traction-wheels on the stub-axles, a clutch member on the same axle and means to operate the movable clutch member, a cross-bar fixed to the uprights pivoted to the stub-axles, a bar fixed to the center of the cross-bar and a lever-bearer and connected with the end of it, a lever pivoted to the lever-bearer and fulcrumed to the top of the upright at the rear and center of the carriage-frame, a seat for an operator at the side of said lever, detents forked at their outer ends and terminating with inclined extensions at their inner ends and a lever pivoted to the upright at the rear of the carriage-frame and provided with a ring at the end of its short arm to admit the extensions of the detents, a rack fixed to the upright and a spring-actuated pawl connected with the lever to lock the detents pivoted to the rear end of carriage-frame for holding and lifting the double elbowed handles and scraper.

15. In a wheel-scraper, an oblong carriage-frame having bridles in its parallel sides to admit trunnions, stub-axles fixed to the parallel sides of the frame, uprights pivotally connected with the stub-axles and a rotatable shaft mounted in the top portions of the uprights, tapering enlargements on the end of the shaft, a scraper having handles fixed to its rear end and trunnions at its sides to traverse the bridles in the sides of the frame, ropes fixed to the handles and to the enlargements on the end of the shaft and springs fixed to the ends of the cross-bar connected with the uprights of the stub-axle and to the sides of the carriage-frame.

HERSCHEL F. PURDUM.

Witnesses:
F. R. STEARNS,
C. C. JAMESON.